(12) United States Patent
Wang et al.

(10) Patent No.: US 11,906,417 B2
(45) Date of Patent: Feb. 20, 2024

(54) RESTORING CORE SAMPLES

(71) Applicant: Saudi Arabian Oil Company, Dhahran (SA)

(72) Inventors: Ying Wang, Beijing (CN); Ming Han, Dhahran (SA); Dongqing Cao, Beijing (CN); Jinxun Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 200 days.

(21) Appl. No.: 17/569,141

(22) Filed: Jan. 5, 2022

(65) Prior Publication Data

US 2023/0212943 A1    Jul. 6, 2023

(51) Int. Cl.
  *G01N 15/08*    (2006.01)
  *G01N 33/24*    (2006.01)

(52) U.S. Cl.
  CPC ......... *G01N 15/0826* (2013.01); *G01N 15/08* (2013.01); *G01N 15/082* (2013.01); *G01N 15/0806* (2013.01); *G01N 15/088* (2013.01)

(58) Field of Classification Search
  CPC .................................................... G01N 33/24
  See application file for complete search history.

(56) References Cited

U.S. PATENT DOCUMENTS

| | | | |
|---|---|---|---|
| 4,532,051 A * | 7/1985 | Nuckels nee Byth | ........................ C09K 23/017 166/275 |
| 2009/0008091 A1* | 1/2009 | Quintero | ................. E21B 37/08 166/270.1 |
| 2017/0044423 A1 | 2/2017 | Weerasooriya et al. | |

FOREIGN PATENT DOCUMENTS

CN    105699411 A  *  6/2016  ............. G01N 25/00

OTHER PUBLICATIONS

Cuiec et al., "On the Necessity of Respecting Reservoir Conditions in Laboratory Displacement Studies," Middle East Technical Conference and Exhibition, Feb. 1979, 11 pages.
Cuiec, "Restoration of the Natural State of Core Samples," Fall Meeting of the Society of Petroleum Engineers of AIME, Sep. 1975, 23 pages.
Cuiec, "Study of Problems Related to the Restoration of the Natural State of Core Samples," J. Can. Pet. Tech., 16(4), Oct. 1977, 68-80, 14 pages.

(Continued)

*Primary Examiner* — Nguyen Q. Ha
(74) *Attorney, Agent, or Firm* — Fish & Richardson P.C.

(57) ABSTRACT

The systems and method described in this specification relate to at least partially restoring porosity and brine permeability of carbonate core samples. The systems and methods include extracting a carbonate core sample from a subterranean formation. The extracted carbonate core sample is inserted into a core flooding test machine. A first porosity and a first brine permeability of the extracted carbonate core sample is measured. A fluid is pumped through the extracted carbonate core sample to flood the carbonate core sample. The fluid includes at least one of a high-molecular weight polymer solution and a gel particle solution. The systems and methods include at least partially restoring the porosity and the brine permeability of the carbonate core sample by pumping an oxidizing solution through the flooded carbonate core sample and heating the carbonate core sample to a temperature of at least 60° C. after pumping the oxidizing solution through the carbonate core sample.

20 Claims, 9 Drawing Sheets

(56) References Cited

OTHER PUBLICATIONS

Fjelde et al., "Removal of mud components from reservoir sandstone rocks," International Symposium of the Society of Core Analysts, Aug. 2015, 12 pages.
Gant et al., "Core Cleaning for Restoration of Native Wettability," SPE Formation Evaluation, 3(01), Mar. 1988, 131-138, 8 pages.
Researchgate.net [online], "What are the ways to clean core sample flooded with nano particles," Mar. 2020, retrieved on Nov. 16, 2021 from URL <https://www.researchgate.net/post/what_are_the_ways_to_clean_the_core_sample_flooded_with_nano_particles>, 10 pages.
Wendel et al., "Restored-State Core Analysis for the Hutton Reservoir," SPE Formation Evaluation, 2(04), Dec. 1987, 509-517, 9 pages.

\* cited by examiner

RESTORING CORE SAMPLES

TECHNICAL FIELD

The present disclosure describes systems and methods for restoring carbonate core samples, and in particular, systems and methods for restoring carbonate core samples using oxidizers and heat.

BACKGROUND

Oil wells can be used to recover oil from a subterranean reservoir. The amount of oil recovered from the well generally decreases over time as oil becomes trapped within microstructures of the rock that make up the reservoir. In some examples, chemical flooding (for example, polymer flooding, surfactant flooding, microsphere injection and chemical mixtures) are used to aid in the recovery of the oil. In some examples, engineers perform core flooding experiments on core samples to understand how particular chemicals interact with the rock before using these chemicals in the subterranean reservoir.

SUMMARY

The systems and methods described in this disclosure restore core samples after core flooding experiments so that the core samples can be used in multiple core flooding experiments with different chemicals. For example, the systems and methods described in this disclosure clean the core samples to restore the porosity and permeability of the core sample to at least 85% of pre-tested values (for example, prior to any core flood experiments being performed on the core sample). The systems and methods described in this disclosure use a combination of oxidizers and heat to remove polymers and surfactants from the core samples and restore the porosity and permeability of the core samples. This is a 2-step process of chemical degradation and thermal decomposition to destroy the chemical structures of polymers and surfactants and restore porosity and permeability.

Engineers extract core samples from wellbores in the vicinity of the subterranean reservoir and test the core samples in the laboratory. In a core flooding experiment, engineers study how different chemicals flow through the pores of the core sample. These experiments simulate the flow of these chemicals (for example, high-molecular weight polymers, gel particles, and surfactants) through the subterranean reservoir. Engineers can simulate how reservoirs respond to particular chemicals and how oil recovery is affected by injecting these chemicals into the reservoir.

In some cases, the subterranean reservoir and the core sample consists of carbonate rock. Carbonates mainly include calcite and are sensitive to environment conditions such as acidic environments and high temperature environments. For example, carbonates can begin to degrade if subject to temperatures above 700° C.

Cleaning carbonate rock after chemical core-flooding experiments poses a significant challenge. For example, cleaning is a challenge because traditional acids (for example, diluted hydrofluoric acid) cannot be used on carbonate rock since these acids would cause severe dissolution of the carbonate rock. Cleaning high-molecular weight polymers and gel particles from the core sample, and especially from a carbonate core sample, is difficult because traditional solvents (for example, toluene, menthol, acetic acid, and ethanol) do not degrade high-molecular weight polymers and gel particles. Engineers often discard core samples after chemical core flooding experiments instead of cleaning. Discarding core samples can be expensive and time consuming.

The systems and methods described in this disclosure are suited to clean high-molecular weight polymers (polyacrylamides), gel particles (preformed polyacrylamide-based cross-linked polymers), and surfactants (such as anionic, cationic, nonionic and amphoteric surfactants). In some examples, the systems and methods described in this disclosure are suited to clean a combined flooding of all three kinds of chemicals (for example, high-molecular weight polymers, gel particles, and surfactants) from carbonate core samples after a core flooding experiment. The systems and methods described in this disclosure can restore both the porosity and permeability of the core sample to at least 85% of the pre-tested permeability.

The systems and methods use a process of pumping an oxidizing solution through the core sample and heating the core sample. In some examples, the systems and methods are also used to clean oils and salts from the core sample. In general, the systems and methods are used to clean oil, salts, surfactants, polymers, and/or gel particles from a core sample and restore at least 85% permeability of core samples to their respective pre-tested states.

The systems and methods described in this disclosure perform chemical degradation and thermal decomposition of the chemicals within the core sample to destroy molecular structures of the organic contaminants remaining on the core samples after a core-flooding experiment that involved flooding the core sample with chemicals. For example, after a core-flooding experiment, polymer and gel particles may remain on the core sample and block the pores which can decrease permeability. Surfactant may also adsorb into the rock surface which alters the surface wettability.

In order to reuse the core samples in subsequent core-flooding experiments, the remaining polymer and gel particles need to be removed to recover the porosity and permeability of the core sample for the subsequent testing. Surfactants also need to be cleaned from the core sample to restore the original surface condition. It is also preferable to avoid damaging the core sample while restoring the porosity and permeability values.

In some examples, the core samples are cleaned without damaging the core sample using a combination of (i) flushing the core samples with a 1% of NaClO solution and heating to 95° C. for 2 hours to degrade polymer and polymer gels from the core sample and (ii) heating the core samples in a muffle furnace at 400° C. for 2 hours to decompose surfactant or chemical residues. In some examples, this process restores the porosity and the permeability of a core sample injected with polymer, gels, and surfactants to at least 85% of pre-tested values.

Some systems and methods for at least partially restoring carbonate core samples include extracting a carbonate core sample from a subterranean formation, inserting the extracted carbonate core sample into a core flooding test machine, measuring a first porosity and a first brine permeability of the extracted carbonate core sample, pumping a fluid through the extracted carbonate core sample to flood the carbonate core sample, and at least partially restoring the porosity and the brine permeability of the flooded carbonate core sample. In some cases, at least partially restoring the porosity and the brine permeability of the flooded carbonate core sample is performed by: pumping an oxidizing solution through the carbonate core sample and heating the carbonate core sample to a first temperature of at least 60° C. after pumping the oxidizing solution through the carbonate core sample. In some cases, the fluid includes at least one of a high-molecular weight polymer solution and a gel particle solution.

In some examples, the oxidizing solution includes at least one of NaClO, HClO, K2S2O8, NaBrO, KClO3, and KMnO4. In some cases, the oxidizing solution includes 1% NaClO in 2% KCl.

In some examples, heating the carbonate core sample to the first temperature includes heating the carbonate core sample to a temperature between 60° C. and 100° C. In some cases, at least partially restoring the porosity and the brine permeability of the flooded carbonate core sample further includes maintaining the temperature between 60° C. and 100° C. for a duration between 1 hour and 4 hours.

In some examples, the fluid further includes a surfactant. In some cases, at least partially restoring the porosity and the brine permeability of the flooded carbonate core sample further includes heating the carbonate core sample to a second temperature between 350° C. and 600° C. In some cases, at least partially restoring the porosity and the brine permeability of the flooded carbonate core sample further includes maintaining the second temperature between 350° C. and 600° C. for a duration between 25 minutes and 4 hours. In some cases, heating the carbonate core sample to the second temperature between 350° C. and 600° C. includes controlling the second temperature to heat the carbonate core sample at a rate of between 4° C./min and 6° C./min. In some cases, heating the carbonate core sample to the second temperature between 350° C. and 600° C. includes controlling the second temperature to heat the carbonate core sample at a rate having a stepwise increase of temperature in 50° C. increments with a dwell time of 15 minutes per increment.

In some examples, pumping the oxidizing solution through the carbonate core sample includes pumping a predetermined volume of an oxidizing solution including 1% NaClO in 2% KCl at a volumetric rate of between 0.5 ml/min and 2 ml/min through the carbonate core sample. In some cases, the predetermined volume of the pumped oxidizing solution is at least 5 times greater than a volume of the carbonate core sample.

In some examples, at least partially restoring the porosity and the brine permeability of the flooded carbonate core sample further includes pumping a predetermined volume of a non-oxidizing solution through the carbonate core sample at a volumetric rate of between 4 ml/min and 6 ml/min after heating the carbonate core sample to the temperature between 60° C. and 100° C. and after maintaining the temperature between 60° C. and 100° C. for the duration between 1 hour and 4 hours. In some cases, the non-oxidizing solution includes 2% KCl. In some cases, the predetermined volume of the pumped non-oxidizing solution is at least 5 times greater than the volume of the carbonate core sample.

In some examples, at least partially restoring the porosity and the brine permeability of the flooded carbonate core sample further includes: measuring a second porosity and a second brine permeability of the extracted carbonate core sample, determining (i) whether the measured second porosity is at least 85% of the measured first porosity and (ii) whether the measured second brine permeability is at least 85% of the measured first brine permeability, and responsive to determining that at least one of the measured second porosity is not at least 85% of the measured first porosity and the measured second brine permeability is not at least 85% of the measured first brine permeability: pumping the oxidizing solution through the carbonate core sample and heating the carbonate core sample to the first temperature of at least 60° C. after pumping the oxidizing solution through the carbonate core sample.

In some examples, the fluid includes a high-molecular-weight acrylamide-based polymer solution, a super-molecular-weight polyacrylamide-based gel particle solution, or both.

Some systems and methods for at least partially restoring carbonate core samples include inserting a carbonate core sample extracted from a subterranean formation into a core flooding test machine, measuring a first porosity and a first brine permeability of the extracted carbonate core sample, pumping a fluid through the extracted carbonate core sample to flood the carbonate core sample, the fluid including at least one of a high-molecular weight polymer solution and a gel particle solution, and at least partially restoring the porosity and the brine permeability of the flooded carbonate core sample. In some cases, at least partially restoring the porosity and the brine permeability of the flooded carbonate core sample is performed by: pumping an oxidizing solution through the flooded carbonate core sample, heating the flooded carbonate core sample to a temperature of between 60° C. and 600° C.; and maintaining the temperature for at least 25 minutes. In some cases, the oxidizing solution includes 1% NaClO in 2% KCl.

In some examples, heating the flooded carbonate core sample to a temperature between 60° C. and 600° C. includes heating the carbonate core sample to a temperature between 90° C. and 100° C. In some examples, maintaining the temperature for at least 25 minutes includes maintaining the temperature for between 6 hours and 10 hours.

In some examples, the fluid further includes a surfactant. In some cases, heating the flooded carbonate core sample to a temperature between 60° C. and 600° C. includes heating the carbonate core sample to a temperature between 220° C. and 600° C. In some cases, maintaining the temperature for at least 25 minutes includes maintaining the temperature for between 25 minutes and 4 hours.

In some examples, heating the flooded carbonate core sample to a temperature of at least 60° C. includes heating the carbonate core sample to a temperature between 60° C. and 100° C. In some cases, maintaining the temperature for at least 25 minutes includes maintaining the temperature for between 1 hour and 4 hours.

In some examples, pumping the oxidizing solution through the flooded carbonate core sample includes pumping a predetermined volume of the oxidizing solution through the carbonate core sample at a volumetric rate of between 0.5 ml/min and 2 ml/min. In some cases, the predetermined volume of the pumped oxidizing solution is at least 5 times greater than a volume of the carbonate core sample.

In some examples, at least partially restoring the porosity and the brine permeability of the flooded carbonate core sample further includes pumping a predetermined volume of a non-oxidizing solution through the carbonate core sample at a volumetric rate of between 4 ml/min and 6 ml/min. In some cases, the predetermined volume of the pumped non-oxidizing solution is at least 5 times greater than a volume of the carbonate core sample.

In some examples, at least partially restoring the porosity and the brine permeability of the flooded carbonate core sample further includes: determining (i) whether the measured second porosity is at least 85% of the measured first porosity and (ii) whether the measured second brine permeability is at least 85% of the measured first brine permeability, and responsive to determining that at least one of the measured second porosity is not at least 85% of the measured first porosity and the measured second brine permeability is not at least 85% of the measured first brine permeability: pumping the oxidizing solution through the flooded carbonate core sample, heating the flooded carbonate core sample to the temperature of between 60° C. and 600° C., and maintaining the temperature for at least 25 minutes.

The systems and methods described in this disclosure are an improvement over using solvents to clean carbonate core samples because traditional solvents cannot be used to effectively clean polymers and gels from carbonate core samples. The systems and methods described in this disclosure use oxidizers and heat to destroy molecular structures of such chemicals to effectively clean the carbonate core samples and restore porosity and permeability.

The systems and methods described in this disclosure achieve thermal degradation of surfactants while avoiding carbonate damage. For example, the systems and methods control the temperatures of the core sample to above 220° C. to break down the surfactants while controlling the temperatures of the core sample to remain below 700° C. to avoid breakdown of the carbonate.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

The systems and methods described in this disclosure restore core samples after core flooding experiments so that the core samples can be used in multiple core flooding experiments with different chemicals. For example, the systems and methods described in this disclosure clean the core samples to restore the porosity and permeability of the core sample to at least 85% of pre-tested values (for example, prior to any core flood experiments being performed on the core sample). The systems and methods described in this disclosure use a combination of oxidizers and heat to remove polymers and surfactants from the core samples and to restore the porosity and permeability of the core samples. This is a 2-step process of chemical degradation and thermal decomposition to destroy the chemical structures of polymers and surfactants and restore porosity and permeability.

In some examples, the core samples are cleaned using a combination of (i) flushing the core samples with a 1% of NaClO solution and heating to 95° C. for 2 hours to degrade polymer and polymer gels from the core sample and (ii) heating the core samples in a muffle furnace at 400° C. for 2 hours to decompose surfactant or chemical residues. In some examples, this process restores the porosity and permeability of the core sample to at least 85% of pre-tested values.

Figure 1:
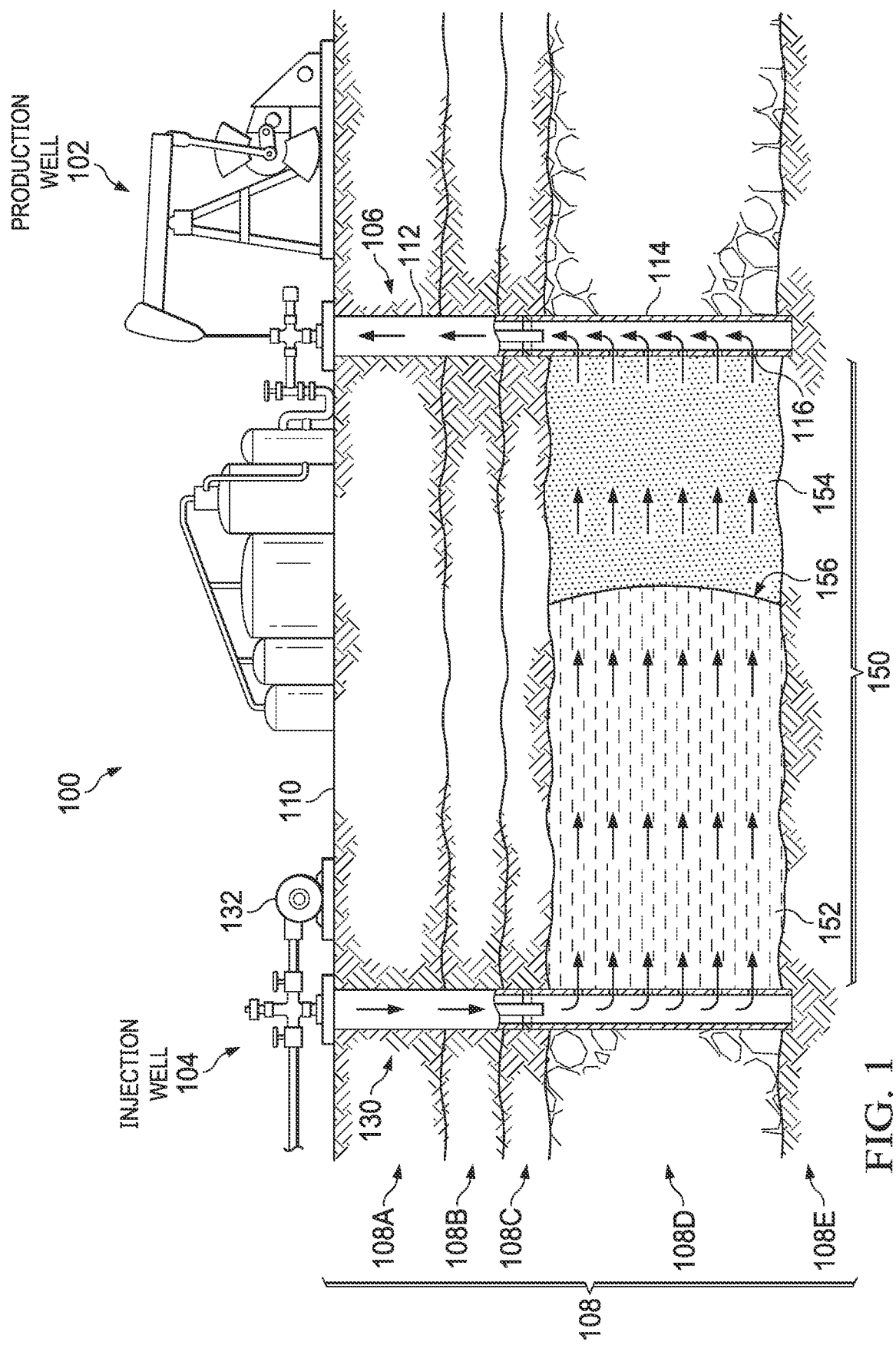
FIG. 1 is a schematic diagram of an example wellbore system.

FIG. 1 is a schematic diagram of wellbore system 100 that includes a production well 102 and an injection well 104. The production well 102 includes a vertical wellbore 106 formed into a subterranean formation 108. In some examples, the wellbore 106 is formed by drilling into one or more layers of the subterranean formation 108. In this example, the wellbore 106 extends through four layers 108A-D and lands in subterranean layer 108E. A reservoir 150 of hydrocarbon 154 (for example, oil) is located within subterranean layer 108D. The reservoir 150 includes porous carbonate rock with pores that contain the hydrocarbon 154.

Carbonate rocks are a class of sedimentary rocks composed primarily of carbonate minerals. Some carbonate rocks include limestone, which is composed of calcite or aragonite (for example, different crystal forms of $CaCO_3$), and dolomite rock (for example, dolostone), which is composed of mineral dolomite ($CaMg(CO_3)_2$).

The production well 102 includes a production casing 114 formed downhole of a surface casing 112. In some examples, both the surface casing 112 and the production casing 114 are formed and set within the wellbore 106 by pouring cement between each respective casing 112, 114, and the subterranean layers 108A-108E. The production casing 114 includes one or more perforations 116 that allow the hydrocarbon 154 to flow from the reservoir 150 into the wellbore 106 and up to the ground surface 110.

The injection well 104 includes a wellbore 130 that is the same as the wellbore 106 of the production well 102 except for the following differences. The injection well 104 includes a pump 132 that pumps a displacing fluid 152 (for example, water and/or chemicals) into the reservoir 150. In some examples, the injection of the fluid 152 increases a recovery of the hydrocarbon 154 from the reservoir 150 because the fluid 152 forces the hydrocarbon 154 through the porous carbonate rock to the production well 102. The region where the fluid 152 and the hydrocarbon 154 interact is represented by region 156. In some examples, the process of injecting water into the reservoir 150 for this purpose is referred to as "waterflooding," and the process of injecting chemicals into the reservoir 150 for this purpose is referred to as "chemical flooding."

Understanding how particular fluids 152 interact with the reservoir 150 is important. In some examples, injecting fluids 152 with micro-gels and/or polymers increase the wettability of the rock of the reservoir 150 and oil recovery of the reservoir 150. In some examples, the reservoir 150 is flooded by injecting fluid 152 that includes chemicals in an aqueous solution. The chemicals include low-molecularweight surfactants, high-molecular-weight acrylamide-based polymers, and/or super-molecular-weight polyacrylamide-based gel particles. These chemicals increase the wettability of the rock and/or improve residual oil saturation of the reservoir 150. Residual oil saturation of the reservoir 150 indicates of how much hydrocarbon 154 is recoverable from the reservoir 150 when a particular displacing fluid 152 is used.

Figure 2A:
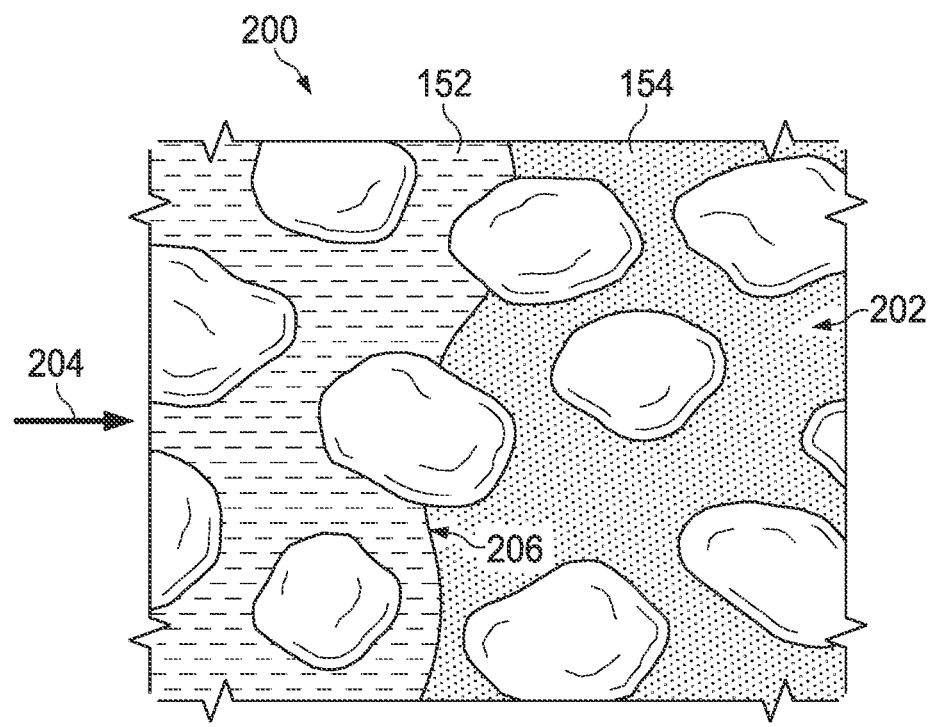
FIGS. 2A and 2B are schematic views of a fluid interface and residual oil within a porous carbonate rock of a reservoir.

FIG. 2A is a schematic view of the hydrocarbon 154 flowing through a carbonate rock 200 of the reservoir 150. The carbonate rock 200 includes a microstructure with one or more pores 202 (generally represented in FIG. 2A as the space where the displacing fluid 152 and hydrocarbon 154 flow). During a chemical flooding (or water flooding) operation, the displacing fluid 152 flows through the carbonate rock 200 in the direction represented by arrow 204. The interface 206 between the fluid 152 and the hydrocarbon 154 forms a wave-front that propagates through the porous rock 200 in the direction represented by the arrow 204. The displacing fluid 152 displaces the hydrocarbon 154 out of the reservoir 150 through the production well 102 (shown in FIG. 1).

Figure 2B:
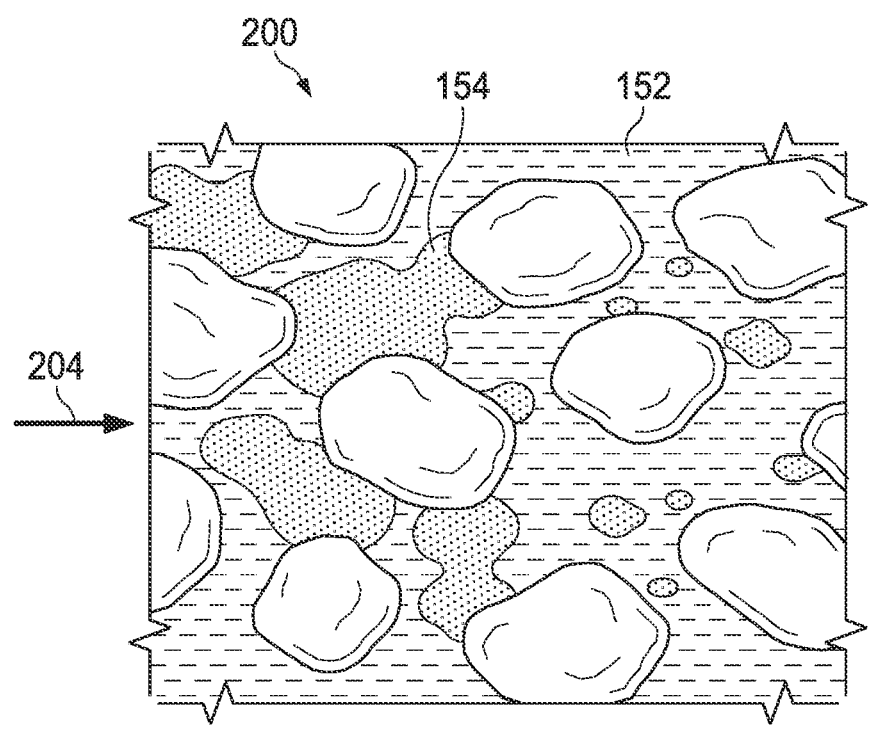

FIG. 2B is a schematic view of residual hydrocarbon 154 within the carbonate rock 200. The choice of a particular displacing fluid 152 affects the wettability and oil recovery of the reservoir 150. In FIG. 2B, residual hydrocarbon 154 becomes trapped within the pores of the porous rock 200. Trapped hydrocarbon 154 is undesirable. In some examples, the residual hydrocarbon 154 does not substantially move towards the production well 102 when displacing fluid 152 is continuously pumped into the reservoir 150 using the injection well 104. Selecting the displacing fluid 152 is an important aspect of reducing trapped residual hydrocarbon 154 of the reservoir 150.

Figure 3:
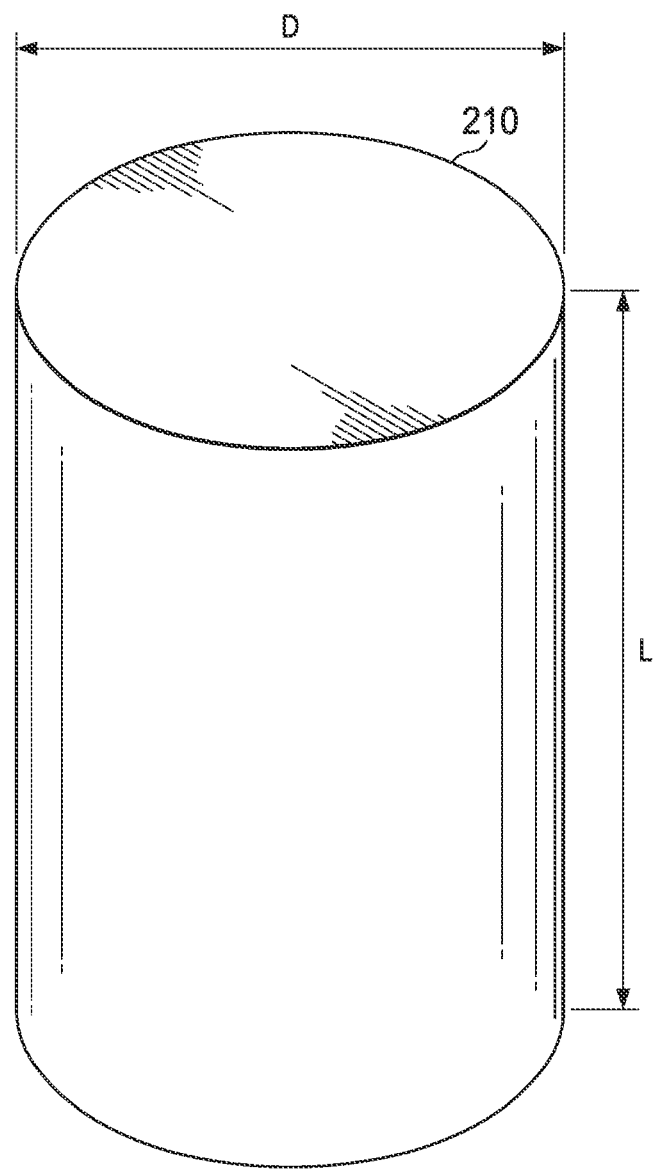
FIG. 3 is a perspective view of a core sample extracted from a reservoir.

FIG. 3 is a perspective views of a core sample 210 extracted from the reservoir 150. The core sample 210 is sometimes referred to as a core plug. In some examples, a drill (not shown) with a core bit is used to drill into the formation of the reservoir 150 and extract the core sample 210 from the reservoir 150. In some examples, core samples are extracted from one or more locations of the reservoir 150 so that engineers can study the properties (for example, porosity, permeability, density, shear modulus, bulk modulus, and hardness) of the rock that spans the reservoir 150.

The core sample 210 is a cylindrical sample having a diameter (D) of about 1.5 inches (3.8 cm) and a length (L) of about 4 inches (10.16 cm). In some examples, the core sample 210 has a diameter (D) between 1 and 4 inches (between 2.5 and 10 centimeters) and an axial length between 3 and 6 in (between 7.6 and 15.2 centimeters).

Figure 4:
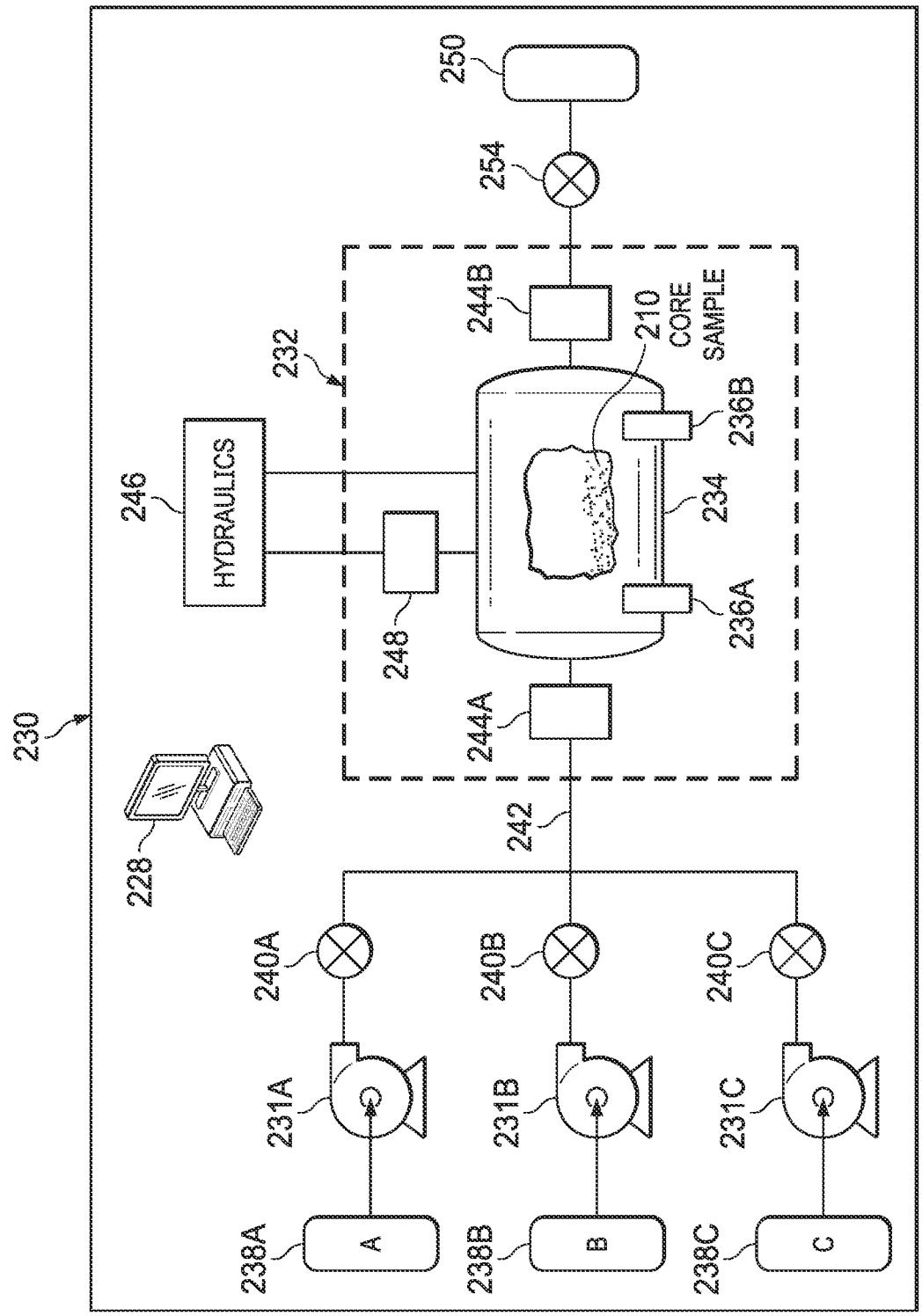
FIG. 4 is a schematic of a core sample restoration system.

FIG. 4 is a schematic of a core sample restoration system 230. In some examples, the core sample restoration system 230 includes commercial testing equipment such as the AFS-300 Coreflooding System from Core Lab USA. In the example described with reference to FIG. 4, the core sample restoration system 230 is configured to both perform a core-flooding experiment and to clean and restore core samples after the core-flooding experiment has been performed.

The core sample restoration system 230 includes a computer 228 operable to control various aspects of the core sample restoration system 230. In some examples, the computer 228 is similar to, or the same as, the computer 400 described with reference to FIG. 11.

The core sample restoration system 230 includes a furnace 232 operable to heat objects inside the furnace 232 to temperatures up to 700° C. For example, the computer 228 controls the furnace 232 to heat the objects inside the furnace 232 and controls the temperature of the furnace 232 to 700° C.

A core sample holder 234 and two end caps 236A, 236B are mounted inside the furnace 232. A user places a core sample (for example, the core sample 210) inside the core sample restoration system 230 by attaching the core sample 210 to the core sample holder 234 and the two end caps 236A, 236B. The particular dimensions and size of the core holder 234 depend on the diameter (D) and length (L) of the core sample 210. The user then closes the doors to the furnace 232 to both thermally insulate the core sample 210 from the ambient surroundings of the laboratory and form a pressure seal around the core sample 210 so the core sample 210 can be pressurized.

The core sample restoration system 230 includes a plurality of pumps 231A-231C, valves 240A-240C, and containers 238A-238C. While three of each of these components are represented in FIG. 4, some core sample restoration systems include more than three (for example, 5, 6, or 10) and some core sample restoration systems include less than three (for example, 1 or 2).

The first pump 231A is operable to pump a first fluid (fluid "A") to and through the core sample 210. For example, the computer 228 controls the pump 231A to pump the first fluid from a first container 238A to and through the core sample 210. The core sample restoration system 230 includes a first valve 240A fluidly connected to the first container 238A for throttling the flow of the first fluid through the inlet fluid lines 242. The computer 228 controls the first valve 240A to open, close, or open a particular percentage to throttle the flow of the first fluid. In some examples, the first fluid is or includes water (for example, fresh water, distilled water, connate water, seawater, Qatar seawater, or brine).

The second pump 231B is operable to pump a second fluid (fluid "B") to and through the core sample 210. For example, the computer 228 controls the pump 231B to pump the second fluid from a second container 238B to and through the core sample 210. The core sample restoration system 230 includes a second valve 240B fluidly connected to the second container 238B for throttling the flow of second fluid through the inlet fluid lines 242. The computer 228 controls the second valve 240B to open, close, or open a particular percentage to throttle the flow of the second fluid. In some examples, the second fluid is an oxidizing solution (for example, a NaClO, HClO, $K_2S_2O_8$, NaBrO, $KClO_3$, or $KMnO_4$).

The third pump 231C is operable to pump a third fluid (fluid "C") to and through the core sample 210. For example, the computer 228 controls the pump 231C to pump the third fluid from a third container 238C to and through the core sample 210. The core sample restoration system 230 includes a third valve 240C fluidly connected to the third container 238C for throttling the flow of third fluid through the inlet fluid lines 242. The computer 228 controls the third valve 240C to open, close, or open a particular percentage to throttle the flow of the third fluid. In some examples, the third fluid is a non-oxidizing solution that includes KCl.

The core sample restoration system 230 includes a pair of flow meters 244A, 244B to measure the flow rate of the fluid as the fluid passes through the core sample 210. A first flow meter 244A measures the flow rate of the fluid on an inlet side of the core sample 210 and a second flow meter 244B measures the flow rate of the fluid on an outlet side of the core sample 210. Both of the flow meters 244A, 244B are electrically connected to the computer 228 for data collection and processing.

The core sample restoration system 230 includes a hydraulic system 246 operable to pressurize the core sample 210 up to at least 5000 psi. In some examples, the computer 228 controls the hydraulic system 246 to pressurize the core sample 210 to pressures between 1000 psi and 5000 psi to measure a porosity of the core sample 210. In some examples, the hydraulic system 246 includes a hydraulic pump operable to pump hydraulic fluid. A pressure transducer 248 measures a pressure of the core sample 210. In some examples, the computer 228 determines porosity based on data of the pressure transducer 248 representing the measured pressure of the core sample 210.

The core sample restoration system 230 includes an outlet container 250 for collecting fluids after the fluids have been pumped through the core sample 210. The core sample restoration system 230 includes an outlet valve 254 fluidly connected to the outlet container 250 for throttling the flow of the fluid from the core sample 210 to the outlet container 250. For example, the computer 228 controls the outlet valve 254 to open, close, or open a particular percentage to throttle the flow of the fluid out of the core sample 210.

The particular fluids used (for example, the first, second, and third fluids of the first, second, and third containers 238A-283C) and the particular control parameters of the components of the core sample restoration system 230 (for example, the temperature of the furnace 232, the pressures of the hydraulic system 246, the flow rates of the pumps 241A-241C, the throttling of the valves 240A-240C) depend on whether the core sample restoration system 230 is configured to perform a core-flooding experiment or a core restoration process.

In some examples, during a core-flooding experiment, the first fluid is water for rinsing the core sample 210, the second fluid is a micro-gel particle solution for chemical injection through the core sample 210, and the third fluid is polymer solution also for chemical injection through the core sample 210. In some examples, during a core restoration process, the first fluid includes water (for example, connate water, brine, seawater, or Qatar seawater) for rinsing the core sample 210, the second fluid is an oxidizing solution for cleaning the remaining polymer and gels from the core sample 210, and the third fluid is a non-oxidizing solution that includes KCl for rinsing the core sample 210.

Examples 1-5 demonstrate a use of the core sample restoration system 230 to at least partially restore the porosity and permeability of carbonate core samples. Five different core samples were used in these examples to illustrate the repeatability of the core sample restoration system 230. The five core samples may have been taken from different reservoirs. The five core samples are all carbonate cores but have different porosity and permeability.

In some examples, the porosity and/or permeability of the core sample is restored to at least 75% of the pre-tested state using the core sample restoration system 230. In some examples, the porosity and/or permeability of the core sample is restored to at least 85% of the pre-tested state using the core sample restoration system 230.

Example 1—Core Restoration After Injection of Micro-Gel Particles and Polymers

Example 1 represents a core-flooding experiment that used a micro-gel particle and polymer solution followed by a restoration process to remove the remaining micro-gel particle and polymer solution from a core sample after the core-flooding experiment has been performed. The core sample restoration system 230 used a combination of an oxidizer of 1% NaClO in 2% KCl and heat (for example, 95° C. heat) to remove the remaining micro-gel particle and the polymer solution from the core sample.

A. Preparation and Pre-Injection Measurements

Step A1. Containers 238A-238C were emptied and rinsed. The first container 238A was filled with connate water. The second container 238B was filled with brine. The third container 238C was filled with Qatar seawater.

Step A2. The core sample was saturated with connate water using a vacuum. For example, a user places the core sample into a vacuum chamber containing connate water. In some examples, the core sample restoration system 230 includes a vacuum chamber and the connate water is pumped from the first container 238A.

Step A3. The core sample is loaded into the core sample holder 234.

Step A4. The confining pressure was set at 600 psi and the pore pressure was set at 100 psi. For example, a user sets these pressures using a user interface of the core sample restoration system 230. In some examples, the computer 228 presents the user interface on a display.

Step A5. The core sample was injected with connate water at 1 cc/min for at least 5 pore volumes (for example, 5 times a volume of the core sample). For example, the pump 231A pumps connate water from the first container 238A through the core sample at a volumetric flow rate of 1 cc/min.

Step A6. An initial brine permeability was measured at different flow rates of 0.5 cc/min, 1 cc/min, and 2 cc/min. For example, the second pump 231B pumps brine to and through the core sample to measure the permeability.

Step A7. The core sample was flushed with Qatar seawater for 5 pore volumes. For example, the third pump 231C pumps Qatar seawater from the third container 238C through the core sample at a volumetric flow rate of 1 cc/min.

Step A8. The core sample was heated to 95° C. and the 95° C. temperature was maintained for 4 hours. For example, the computer 228 controls the furnace 232 to heat the core sample to 95° C. and maintain this temperature for 4 hours. Maintaining the temperature for 4 hours allows the core sample time to reach thermal equilibrium.

Step A9. The confining and pore pressures were increased step by step (for example, linearly over time) to 4500 psi and 3100 psi, respectively. For example, a user sets these pressures using the user interface of the core sample restoration system 230.

Step A10. The initial porosity was measured. In some examples, the computer 228 determines an initial porosity using an oven and a scale by measuring a dry weight of the core sample and a wet weight of the core sample. In some examples, the dry weight is measured by drying the core sample at 95° C. for 24 hours and weighing a dry weight of the core sample after the core sample has been dried in the oven. In some examples, the wet weight is measured by saturating the core sample with brine (for example, by pumping brine to and through the core sample) and weighing the core sample after the core has been saturated with brine. In such examples, the computer 228 determines the initial porosity by subtracting the dry weight from the wet weight and then dividing by the brine density.

B. Injection and Post-Injection Measurements

Step B1. Containers 238A-238C were emptied and rinsed. The first container 238A was filled with seawater. The second container 238B was filled with a micro-gel particle solution. The third container 238C was filled with a polymer solution.

Step B2. The micro-gel particle and the polymer solutions were co-injected at 0.5 cc/min for 5 pore volumes. For example, the pumps 231B, 231C co-inject (for example, pump at the same time) the micro-gel particle and the polymer solutions to and through the core sample. For example, the pump 231B pumps a micro-gel particle solution to and through the core sample while the pump 231C pumps a polymer solution to and through the core sample. The result being a co-injection of a fluid that includes both the micro-gel particle solution and the polymer solution.

Step B3. Seawater was injected into the core sample. For example, the pump 231A pumps seawater from the first container 238A to and through the core sample after the injecting the micro-gel particle and polymer solutions.

Step B4. Effluent was collected in tubes during the chemical injections. For example, the effluent is collected in the outlet container 250.

Step B5. The differential pressures were measured and recorded during the chemical injections. For example, the pressure transducer 248 measures the pressures of the core sample.

C. Restoration and Post-Restoration Measurements

Step C1. Containers 238A-238C were emptied and rinsed. The first container 238A was filled with connate water. The second container 238B was filled with an oxidizing solution of 1% NaClO in 2% KCl. The third container 238C was filled with a non-oxidizing solution of 2% KCl. In some examples, 2% KCl is used in both the oxidizing and non-oxidizing solutions to protect from carbonate dissolution.

Step C2. The core sample was flushed with 1% NaClO in 2% KCl at 1 ml/min for 5 pore volumes. For example, the pump 231B pumps the oxidizing solution of 1% NaClO in 2% KCl from the second container 238B to and through the core sample.

Step C3. The core sample was soaked with 1% NaClO in 2% KCl solution in a sealed container. For example, computer 228 controls the outlet valve 254 to close to allow the core sample to fill (for example, saturate) with fluid. The computer 228 controls the inlet valves 240A, 240B to close after saturation to trap the fluid within the core sample to soak the core sample in the fluid.

Step C4. The core sample was heated to 95° C. in a furnace and the 95° C. temperature was maintained for 2 hours. For example, the computer 228 controls the furnace 232 to heat the core sample to 95° C. and maintain this temperature for 2 hours. Maintaining the temperature for 2 hours allows the core sample time to reach thermal equilibrium.

Step C5. The core sample was flushed with 2% KCl at 5 ml/min for 5 pore volumes. For example, the pump 231C pumps the non-oxidizing solution of 2% KCl from the third container 238C to and through the core sample.

Step C6. The core sample was flushed with connate water at 1 cc/min for at least 5 pore volume. For example, the pump 231A pumps connate water to and through the core sample.

Step C7. The first container 238A was emptied, rinsed, and filled with brine.

Step C8. The brine permeability of the core sample was measured at different flow rates of 0.5 cc/min, 1 cc/min, and 2 cc/min. For example, the first pump 231A pumps brine to and through the core sample to measure the permeability at three flow rates: 0.5 cc/min, 1 cc/min, and 2 cc/min.

Step C9. The post-injection porosity was measured. In some examples, the computer 228 determines the post-injection porosity using an oven and a scale in a similar manner as described with reference to step A10.

Table 1 represents results for example 1. The pore volume is shown in terms of milliliters and represents the results of the porosity measurements. The gas permeability is shown in terms of milli-darcy (md) and represents the results of the brine permeability measurements.

The results of Table 1 show (i) original porosity and permeability prior to core-flooding testing (for example, pre-injection measurements), (ii) intermediate porosity and permeability measurements after chemical injection (for example, post-injection measurements), and (iii) final porosity and permeability measurements after core restoration treatment using the core sample restoration system 230 (for example, post-restoration measurements).

The results show that the porosity restoration was 95.9% and that the permeability restoration was 94.5%. Both the porosity and the permeability were restored to greater than 94% of their respective initial values in this example. Both the porosity and the permeability were restored to greater than 85% of their respective initial values in this example.

TABLE 1

Results for example 1.

| | Pore volume, ml | Gas permeability, md |
|---|---|---|
| Original | 13.54 | 984.58 |
| After polymer & polymer gel injection | 12.89 | 775.52 |
| After restoration | 12.99 | 929.99 |

Example 2—Core Restoration After Injection of Micro-Gel Particles and Polymers

Example 2 represents a repeat of example 1 applied to a different core sample. All the process details are the same as example 1.

Table 2 represents results for example 2. The results show that the porosity restoration was 98.3% and that the permeability restoration was 90.9%. Both the porosity and the permeability were restored to greater than 90% of their respective initial values in this example. Both the porosity and the permeability were restored to greater than 85% of their respective initial values in this example.

TABLE 2

Results for example 2.

| | Pore volume, ml | Brine permeability, md |
|---|---|---|
| Original | 11.58 | 928.73 |
| After polymer & polymer gel injection | 11.14 | 774.13 |
| After restoration | 11.38 | 844.11 |

Example 3—Core Restoration After the Injection of Micro-Gel Particles and Surfactant Example 3 is similar to examples 1 and 2 except that surfactant was used instead of a polymer solution. In example 3, the core sample restoration system 230 prepared, injected, and restored a different core sample from the core samples of examples 1 and 2. In example 3, the core sample restoration system 230 used a combination of an oxidizer of 1% NaClO in 2% KCl and low heat (for example, 95° C.) to remove the remaining micro-gel particles from the core sample and used high heat (for example, 400° C.) to remove remaining surfactant from the core sample.

A. Preparation and Pre-Injection Measurements

The preparation and pre-injection measurement process is the same as examples 1 and 2.

B. Injection and Post-Injection Measurements

Step B1. Containers 238A-238C were emptied and rinsed. The first container 238A was filled with seawater. The second container 238B was filled with a micro-gel particle solution. The third container 238C was filled with a surfactant.

Step B2. The micro-gel particle solution and the surfactant were co-injected at 0.5 cc/min for 5 pore volumes. For example, the pumps 231B, 231C co-inject (for example, pump at the same time) the micro-gel particle solution and the surfactant to and through the core sample. For example, the pump 231B pumps the micro-gel particle solution to and through the core sample while the pump 231C pumps the surfactant to and through the core sample. The result being a co-injection of a fluid that includes both the micro-gel particle solution and the surfactant.

Step B3. Seawater was injected into the core sample. For example, the pump 231A pumps seawater from the first container 238A to and through the core sample after the injecting the micro-gel particles and the surfactant.

Step B4. Effluent was collected in tubes during the chemical injections. For example, the effluent is collected in the outlet container 250.

Step B5. The differential pressures were measured and recorded during the chemical injections. For example, the pressure transducer 248 measures the pressures of the core sample.

C. Restoration and Post-Restoration Measurements

Step C1. Containers 238A-238C were emptied and rinsed. The first container 238A is filled with connate water. The second container 238B is filled with an oxidizing solution of 1% NaClO in 2% KCl. The third container 238C is filled with a non-oxidizing solution of 2% KCl.

Step C2. The core sample was flushed with 1% NaClO in 2% KCl at 1 ml/min for 5 pore volumes. For example, the pump 231B pumps the oxidizing solution of 1% NaClO in 2% KCl from the second container 238B to and through the core sample.

Step C3. The core sample was soaked with 1% NaClO in 2% KCl solution in sealed container. For example, computer 228 controls the outlet valve 254 to close to allow the core sample to fill (for example, saturate) with fluid. The computer 228 controls the inlet valves 240A, 240B to close after saturation to trap the fluid within the core sample to soak the core sample in the fluid.

Step C4. The core sample was heated to 95° C. in a furnace and the 95° C. temperature was maintained for 2 hours. For example, the computer 228 controls the furnace 232 to heat the core sample to 95° C. and maintain this temperature for 2 hours. Maintaining the temperature for 2 hours allows the core sample time to reach thermal equilibrium.

Step C5. The core sample was flushed with 2% KCl at 5 ml/min for 5 pore volumes. For example, the pump 231C pumps the non-oxidizing solution of 2% KCl from the third container 238C to and through the core sample.

Step C6. The core sample was cleaned by solvent extraction with methanol to remove salts.

Step C7. The core sample was dried in a furnace by heating to 100° C. and maintaining this temperature overnight (for example, for 6-10 hours). For example, the computer 228 controls the furnace 232 to heat the core sample to 100° C. and maintain this temperature for 6-10 hours (for example, 8 hours). Maintaining the temperature for 6-10 hours allows the core sample time to dry.

Step C8. The core sample was cooled in desiccator to room temperature (for example, 20-23° C.).

Step C9. The core sample was heated in a muffle furnace with a temperature rate increase of 5° C./min to 400° C. In examples where the rate of heating cannot be well controlled to provide 5° C./min, a stepwise increase of temperature in 50° C. increments with a dwell time of 15 minutes an acceptable substitution. For example, the computer 228 controls the furnace 232 to heat the core sample to 400° C. in 5° C./min increments. In some examples, the computer 228 controls the furnace 232 to heat the core sample to 400° C. in 50° C. temperature increments after a dwell time of 15 minutes.

Step C10. The 400° C. temperature was maintained for 2 hours. For example, the computer 228 controls the furnace 232 to maintain the 400° C. for 2 hours.

Step C11. The heat of the muffle furnace was turned off to cool the core sample to room temperature with the furnace door closed. For example, the computer 228 controls the furnace 232 to cool the core sample to room temperature (for example, 20-23° C.) while the furnace door remains closed.

Step C12. The core sample was flushed with 2% KCl at 5 ml/min for 5 pore volumes. For example, the pump 231C pumps a non-oxidizing solution of 2% KCl from the third container 238C to and through the core sample.

Step C13. The core sample was flushed with connate water at 1 cc/min for at least 5 pore volume. For example, the pump 231A pumps connate water to and through the core sample.

Step C14. The first container 238A was emptied, rinsed, and filled with brine.

Step C15. The brine permeability of the core sample was measured at different flow rates of 0.5 cc/min, 1 cc/min, and 2 cc/min. For example, the first pump 231A pumps brine to and through the core sample 210 to measure the permeability at three flow rates: 0.5 cc/min, 1 cc/min, and 2 cc/min.

Step C16. The post-injection porosity was measured. In some examples, the computer 228 determines an initial porosity using an oven and a scale by measuring a dry weight of the core sample and a wet weight of the core sample. In some examples, the dry weight is measured by drying the core sample at 95° C. for 24 hours and weighing a dry weight of the core sample after the core sample has been dried in the oven. In some examples, the wet weight is measured by saturating the core sample with brine (for example, by pumping brine to and through the core sample) and weighing the core sample after the core has been saturated with brine. In such examples, the computer 228 determines the post-injection porosity by subtracting the dry weight from the wet weight and then dividing by the brine density.

Table 3 represents results for example 3. The results show that the porosity restoration was 96.1% and that the permeability restoration was 88.3%. Both the porosity and the permeability were restored to greater than 85% of their respective initial values in this example.

TABLE 3

Results for example 3.

|  | Pore volume, ml | Brine permeability, md |
|---|---|---|
| Original | 11.89 | 520.04 |
| After surfactant & polymer gel injection | 11.4 | 356.36 |
| After restoration | 11.43 | 459.21 |

Example 4—Core Restoration After the Injection of Micro-Gel Particles and Surfactant Example 4 is a repeat of example 3 applied to a different core sample. All the process details were the same as example 3.

Table 4 represents results for example 4. The results show that the porosity restoration was 100% and that the permeability restoration was 86.1%. Both the porosity and the permeability were restored to greater than 85% of their respective initial values in this example.

TABLE 4

Results for example 4.

|  | Pore volume, ml | Brine permeability, md |
|---|---|---|
| Original | 11.05 | 529.79 |
| After surfactant & polymer gel injection | 10.9 | 341.45 |
| After restoration | 11.05 | 456.28 |

Example 5—Core Restoration After the Injection of Gel Particles

Example 5 is similar to examples 1-4 except that no surfactant and no polymer was used in this example. The gel particles used during the experiment were the same (for example, same size, same chemicals) as the previous examples to produce consistent test results. In example 5, the core sample restoration system 230 prepared, injected, and restored a different core sample from the core samples of examples 1-4. In example 5, the core sample restoration system 230 used a combination of an oxidizer of 1% NaClO in 2% KCl and heat to remove the remaining micro-gel particles from the core sample.

A. Preparation and Pre-Injection Measurements

All the preparation and pre-injection process were same as examples 1-4.

B. Injection and Post-Injection Measurements

Step B1. Containers 238A-238C were emptied and rinsed. The first container 238A was filled with seawater. The second container 238B was filled with a gel particle solution. The third container 238C was not used in this example.

Step B2. The gel particle solution was injected at 0.5 cc/min for 5 pore volumes. For example, the pumps 231B injects the gel particle solution to and through the core sample.

Step B3. Seawater was injected into the core sample. For example, the pump 231A pumps seawater from the first container 238A to and through the core sample after injecting the gel particle solution.

Step B4. Effluent was collected in tubes during the chemical injections. For example, the effluent is collected in the outlet container 250.

Step B5. The differential pressures were measured and recorded during the chemical injections. For example, the pressure transducer 248 measures the pressures of the core sample and the computer 228 determines an initial porosity and a post-injection porosity based on these differential pressures.

C. Restoration and Post-Restoration Measurements

All the restoration and post-restoration process steps are same as examples 1 and 2.

Table 5 represents results for example 5. The results show that the porosity restoration was 99.8% and that the permeability restoration was 96.8%. Both the porosity and the permeability were restored to greater than 95% of their respective initial values in this example. Both the porosity and the permeability were restored to greater than 85% of their respective initial values in this example.

TABLE 5

Results for example 5.

|  | Pore volume, ml | Gas permeability, md |
|---|---|---|
| Original | 12.43 | 1540 |
| After micro-gel injection | 11.37 | 495 |
| After restoration | 12.40 | 1490 |

While examples 1-4 used specific temperatures, durations, and oxidizers, other temperature, durations, and oxidizers can be used with the core sample restoration system 230 to achieve similar restoration results. For example, some core sample restoration systems use an oxidizer of HClO, $K_2S_2O_8$, NaBrO, $KClO_3$, or $KMnO_4$ instead of, or in addition to, NaClO.

Some core sample restoration systems 230 heat a furnace to a temperature between 60° C. and 100° C. for a duration between 1 hour and 4 hours instead of, or in addition to, 95° C. for 2 hours. Some core sample restoration systems 230 heat a furnace to a temperature between 350° C. and 600° C. for a duration between 25 minutes and 4 hours instead of, or in addition to, 400° C. for 2 hours.

Some core sample restoration systems 230 pump fluid at rates between 0.3 cc/min and 0.7 cc/min instead of, or in addition to, 0.5 cc/min. Some core sample restoration systems 230 pump less than 5 pore volumes (for example, between 1 and 4) and some pump more than 5 pore volumes (for example, between 6 and 20).

FIGS. 5-9 are data plots supporting the results of using low concentration oxidizers on the core samples to remove polymers and gels (for example, less than or equal to 1% concentration is sufficient to remove polymers and gels) and using high temperatures on the core samples to decompose surfactants (for example, temperatures between 200° C. and 600° C. do not damage the carbonate of the core sample, and all tested surfactants are decomposed rapidly with increasing temperatures about 20° C.).

Figure 5:
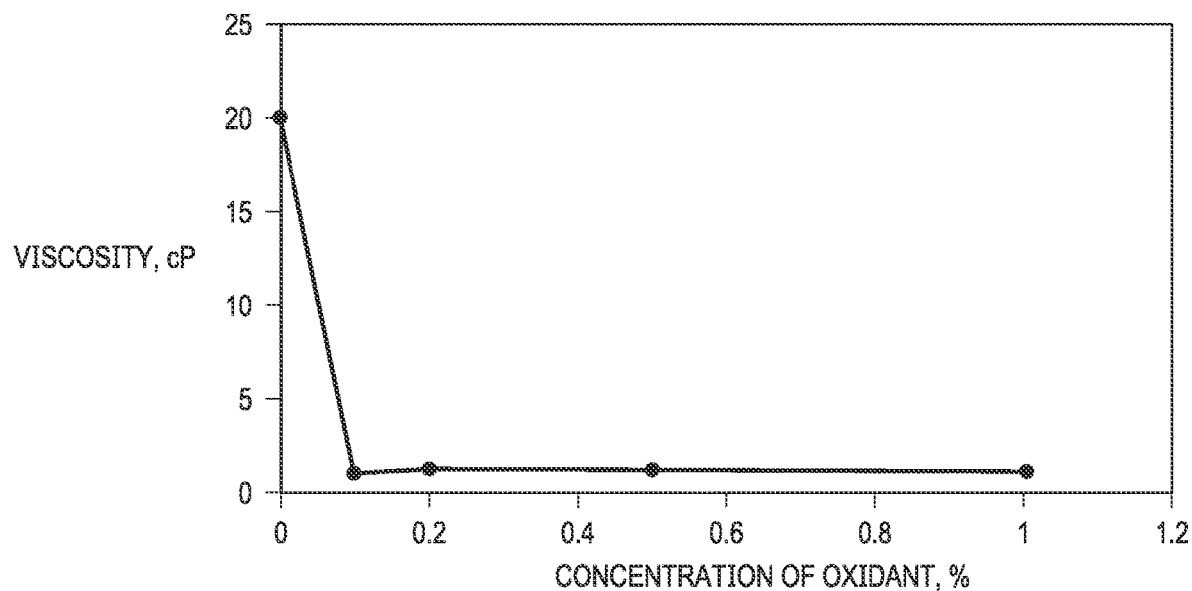
FIG. 5 is a plot of polymer viscosity versus oxidant concentration.

FIG. 5 is a plot of polymer viscosity versus oxidant concentration and represents chemical degradation. The plot shows that viscosity decreases with increasing oxidant concentration. For example, when the core sample restoration system 230 uses a 0.1% concentration oxidant to clean polymers and gels from the core sample, the viscosity lowers from 20 cp to about 1 cp. This lower value of viscosity means that it is easier to clean the polymer and gels from the core sample using water. In examples 1-5, the core sample restoration system 230 uses oxidant with a 1% concentration (for example, 1% NaClO) to clean the core sample and then water is pumped through the core sample to remove the degraded compounds.

Figure 6:
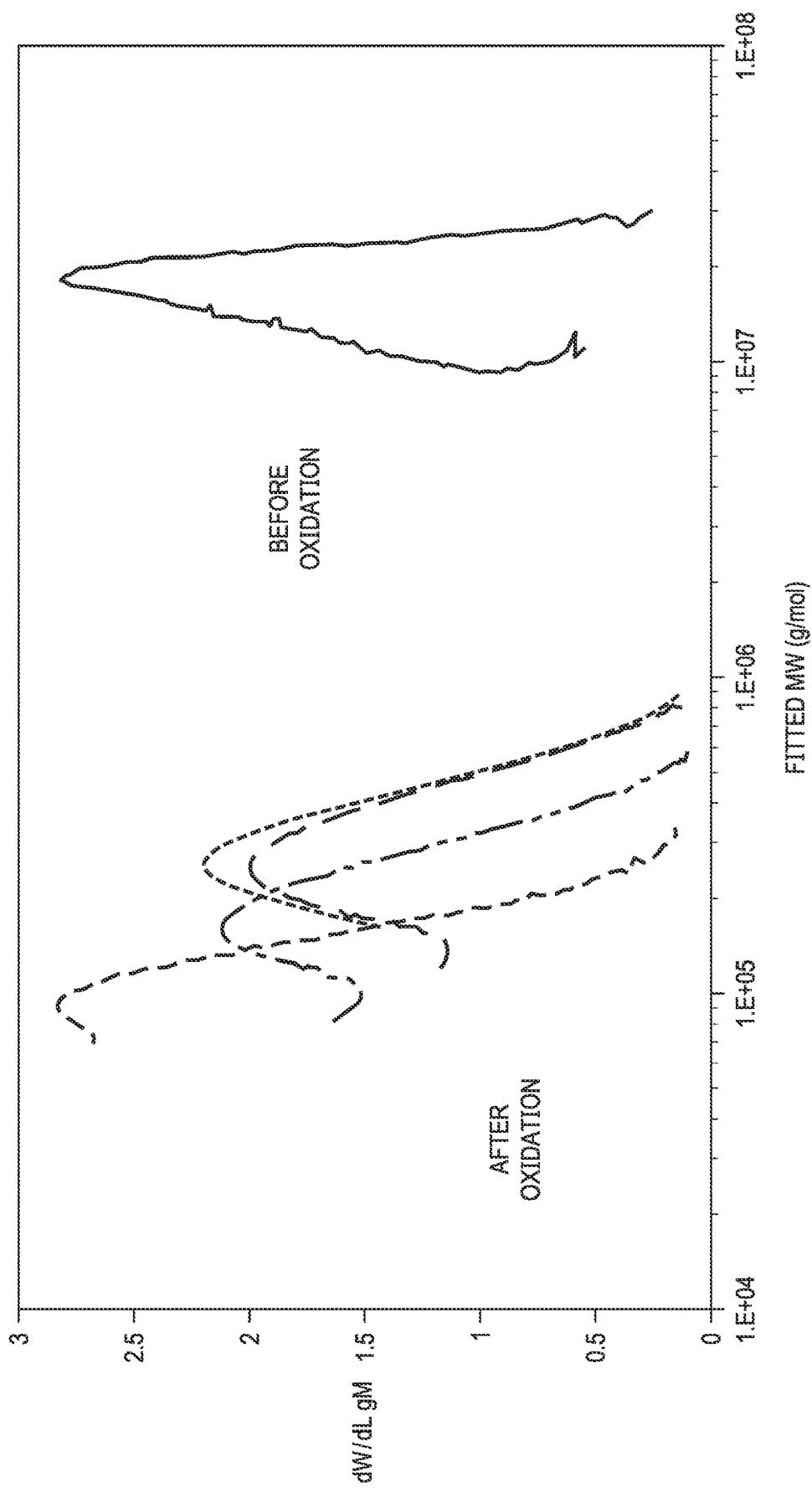
FIG. 6 is a plot of polymer molecular weight changes before and after oxidation based on gel permeation chromatography testing.

FIG. 6 is a plot of polymer molecular weight (MW) changes before and after oxidation based on gel permeation chromatography (GPC) testing. The y-axis represents the signal intensity and the x-axis represents the molecular weight. The results show that the oxidant is operable to degrade polymer from $15 \times 10^7$ Dalton (Da) to less than $1 \times 10^5$. The higher the concentration of oxidant, the lower the molecular weight after degradation. This oxidation is an effective way to degrade polymers within the core sample.

Figure 7:
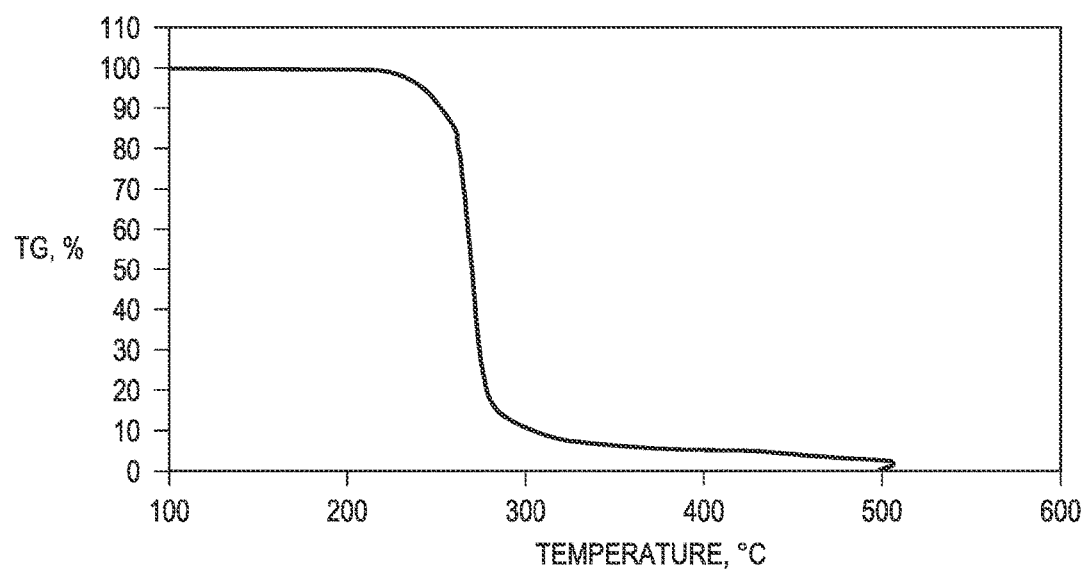
FIG. 7 is a plot of surfactant thermal decomposition based on thermal gravimetric analysis testing.

FIG. 7 is a plot of surfactant thermal decomposition based on thermal gravimetric analysis (TGA) testing. The results indicate that 90% of surfactant is decomposed when heated to between 220° C. and 300° C. This thermal decomposition is an effective way to clean surfactant contamination from the core sample. For example, heating the carbonate core sample in a muffle furnace at 400° C. decomposes low-molecular-weight compounds.

Figure 8:
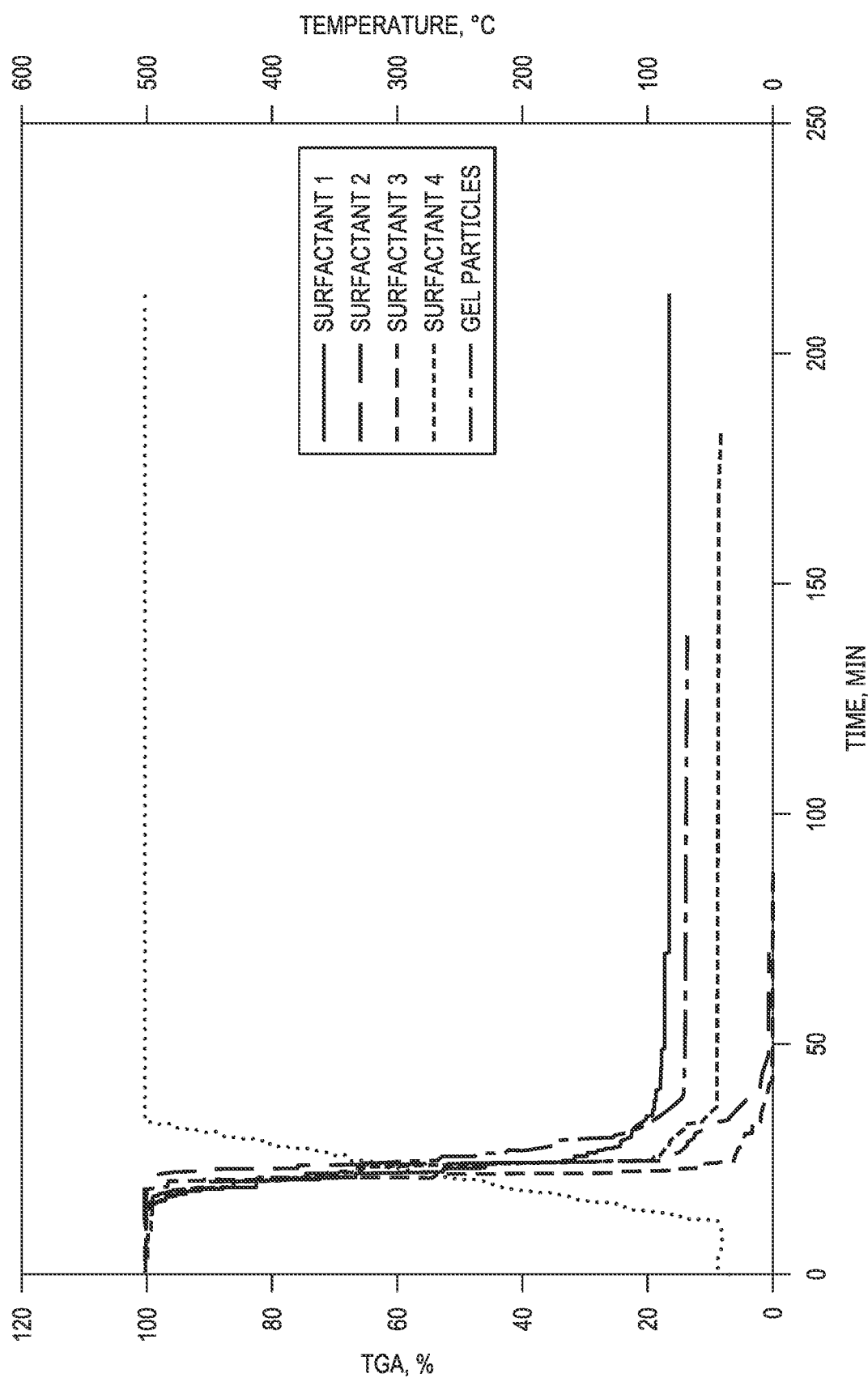
FIG. 8 is a plot of surfactants and polymer gel thermal decomposition versus time based on thermal gravimetric analysis testing.

FIG. 8 is a plot of surfactants and polymer gel thermal decomposition versus time based on thermal gravimetric analysis testing. The results indicate that all surfactants and gel particles are decomposed in less than 50 minutes upon being heated at 400° C. The four surfactants represented in FIG. 8 cover all four kinds of surfactant: anionic, cationic, nonionic, and amphoteric surfactant.

Figure 9:
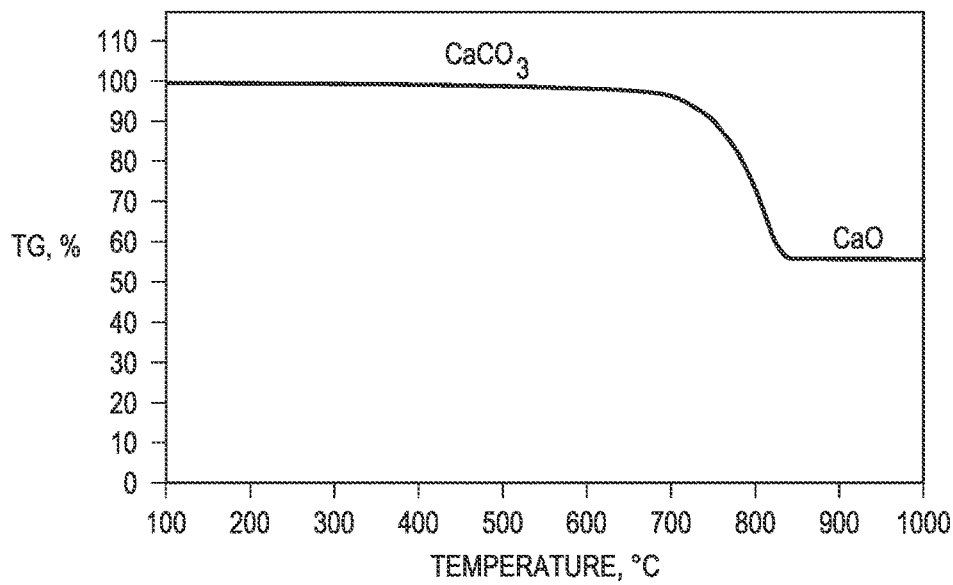
FIG. 9 is a plot of calcite decomposition versus temperature.

FIG. 9 is a plot of calcite decomposition versus temperature. This plot shows the effect of temperature on calcite decomposition. A thermal gravimetric analysis was conducted with carbonate powder (for example, calcium carbonate ($CaCO_3$) powder) to determine whether the high temperatures (for example, greater than 200° C.) used to remove surfactant would cause damage to carbonate core samples. The calcium carbonate showed to be stable below 500° C. and started to decompose when temperatures increased beyond about 650° C. Calcium carbonate decomposed to calcium oxide (CaO) at 840° C. The results of this experiment indicate that it is safe to decompose surfactants and polymer gel using temperatures around 500° C. (and up to about 700° C.) without damage to the core samples.

Figure 10:
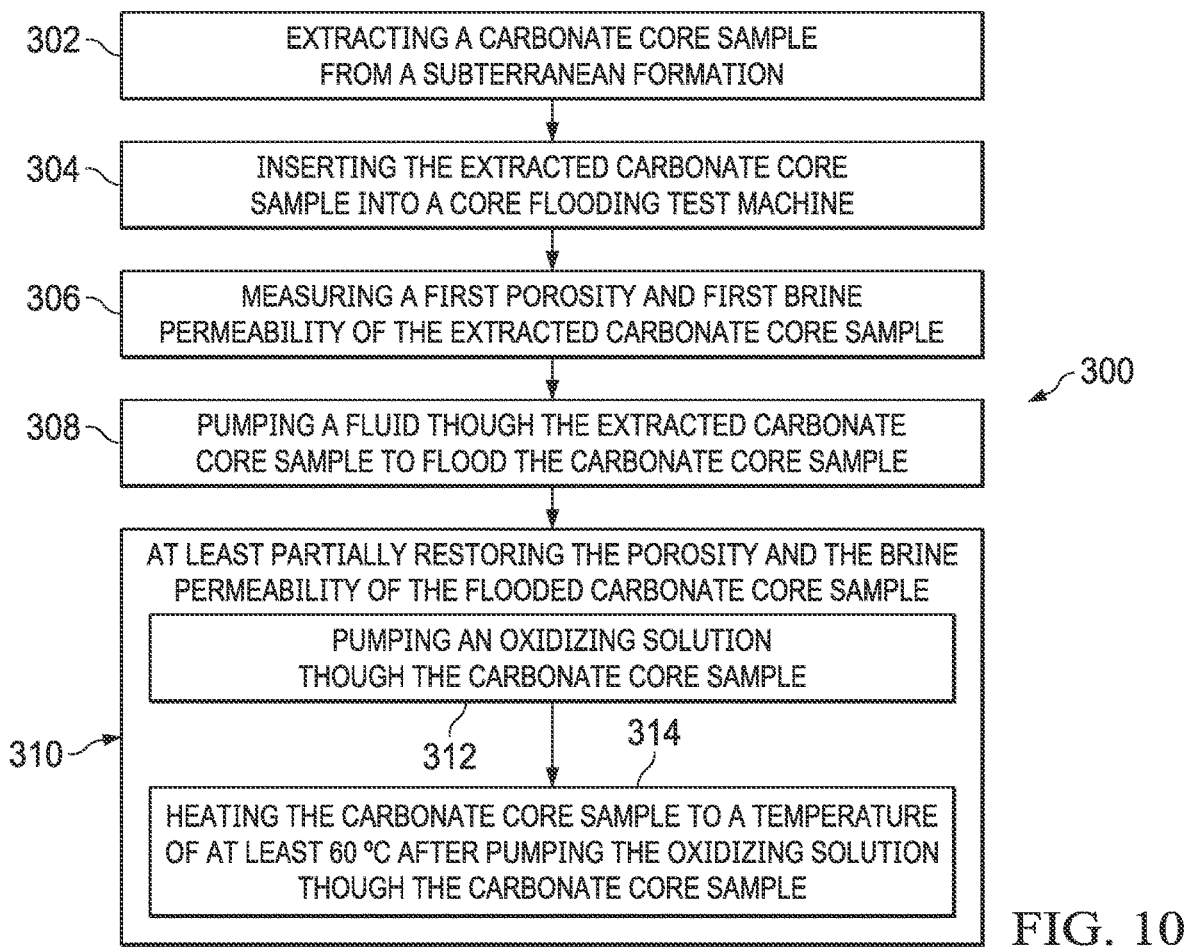
FIG. 10 is a flowchart of a core sample restoration process.

FIG. 10 is a flowchart of an example core sample restoration method 300. In some examples, the core sample restoration system 230 performs one or more steps of the method 300. In some examples, a user performs one or more steps of the method 300. In some examples, the method 300 includes any and all of the steps described with reference to examples 1-5.

The method 300 at least partially restores carbonate core samples (or core plugs). The method 300 is used to clean chemicals (for example, polymers, surfactants, and gel particles) from the core samples and restore the porosity and permeability of the core sample to initial values (for example, a state before any chemical core-flooding has been performed on the core sample). In some examples, both porosity and permeability are restored to at least 85% of their initial states. For example, examples 1-5 illustrate that both porosity and permeability are restored to at least 85% after restoration using the core sample restoration system 230.

The particular method used depends on the chemicals used during the core-flooding experiments. For example, if surfactant is used during the core-flooding experiment, then the core sample is subject to high temperatures (for example, greater than or equal to 400° C.) to decompose the surfactant. In some examples, such high temperatures are not necessary if surfactant is not present.

At step 302, a carbonate core sample is extracted from a subterranean formation. For example, a core drill bit is used to extract the carbonate core sample from a subterranean formation of a reservoir. The carbonate core sample includes calcite. In some examples, the carbonate core sample is entirely calcite.

The core sample is prepared and pre-injection measurements are obtained. The following steps generally align with the processes described with reference to preparation and pre-injection measurements section (for example, section A) of the examples.

In some examples, the core sample is cleaned to remove drilling mud and saturated with connate water using a vacuum. For example, a user cleans the core sample and places the core sample into a vacuum chamber containing connate water.

At step 304, the extracted carbonate core sample is inserted into a core flooding test machine. For example, the carbonate core sample is inserted into the core sample restoration system 230 which includes a core flooding capability. In some examples, a user loads the core sample into the core sample holder 234 of the core sample restoration system 230.

In some examples, the confining pressure is set to 600 psi and the pore pressure is set to 100 psi. For example, a user sets these pressures using a user interface of the core sample restoration system 230.

In some examples, a pump pumps connate water into the core sample with a flow rate between 0.5 cc/min and 2 cc/min for at least 5 pore volumes (for example, 5 times a volume of the core sample). For example, the pump 231A pumps connate water from the first container 238A through the core sample at a volumetric flow rate between 0.5 cc/min and 2 cc/min (for example, 1 cc/min).

At step 306, a first porosity and a first brine permeability of the extracted carbonate core sample is measured. In some examples, the first porosity is measured using an oven and a scale. For example, the oven dries the core sample at 95° C. for 24 hours and the scale measures a dry weight of the core sample after the core sample was dried in the oven. The core sample is saturated with brine (for example, by pumping brine to and through the core sample). The scale measures a wet weight of the core sample after the core was saturated with brine. In such examples, the computer 228 determines the first porosity by subtracting the dry weight from the wet weight and then dividing by the brine density.

In some examples, the second pump 231B pumps brine to and through the core sample to measure the permeability prior to chemical core-flooding. In some examples, three initial brine permeability measurements are obtained at three different flow rates of 0.5 cc/min, 1 cc/min, and 2 cc/min. In such cases, the core sample restoration system 230 determines an average permeability based on the three permeability measurements. For example, the computer 228 determines an average initial permeability based on the three permeability measurements obtained using the three flow rates of 0.5 cc/min, 1 cc/min, and 2 cc/min.

In some examples, the core sample is flushed with Qatar seawater for 5 pore volumes. For example, the third pump 231C pumps Qatar seawater from the third container 238C through the core sample at a volumetric flow rate of 1 cc/min.

In some examples, the core sample is heated to 95° C. and the 95° C. temperature is maintained for 4 hours. For example, the computer 228 controls the furnace 232 to heat the core sample to 95° C. and maintain this temperature for 4 hours.

The core sample is injected with fluid as part of a chemical core-flooding experiment and post-injection measurements are obtained. The following steps generally align with the processes described with reference to the injection and post-injection measurements section (for example, section B) of the examples.

At step 308, a fluid is pumped through the extracted carbonate core sample to flood the carbonate core sample. For example, pumps 231A-231C pump a fluid through the core sample. In some examples, the fluid includes at least one of a high-molecular weight polymer and a gel particle. In some examples, the fluid includes at least one of a high-molecular-weight acrylamide-based polymer and a super-molecular-weight polyacrylamide-based gel particle. In some examples, the gel particles are micro-gel particles that have a diameter of between 1 micrometer and 1 millimeter.

In some cases, the fluid is pumped through the extracted carbonate core sample by co-injecting at least two of a polymer, a gel, and a surfactant. In some examples, this co-injection results in a mixture of the two co-injected fluids. For example, pumps 231A-231C pump (or co-pump, co-inject) a fluid through the core sample at the same time to cause a mixture of the at least two of the polymer, the gel, and the surfactant.

In some examples, seawater is injected into the core sample. For example, the pump 231A pumps seawater from the first container 238A to and through the core sample after injecting the fluid into the core sample. In some examples, effluent is collected in tubes during the fluid injections. For example, the effluent is collected in the outlet container 250.

In some examples, differential pressures are measured and recorded during the fluid injections. In some examples, the pressure transducer 248 measures the pressures of the core sample and the computer 228 determines an initial porosity and a post-injection porosity based on these differential pressures.

The core sample is restored after chemical core-flooding experiment and post-restoration measurements are obtained. The following steps generally align with the processes described with reference to the restoration and post-restoration measurements section (for example, section C) of the examples.

At step 310, the porosity and the brine permeability of the flooded carbonate core sample is at least partially restored. In some examples, at least partially restoring the porosity and the brine permeability is achieved using at least steps 312 and 314.

At step 312, an oxidizing solution is pumped through the carbonate core sample. In some examples, the oxidizing solution includes at least one of NaClO, HClO, $K_2S_2O_8$, $NaBrO$, $KClO_3$, and $KMnO_4$. In some examples, the oxidizing solution includes and/or is 1% NaClO in 2% KCl. For example, the pump 231B pumps an oxidizing solution of 1% NaClO in 2% KCl from the second container 238B to and through the core sample.

In some examples, pumping the oxidizing solution through the carbonate core sample includes pumping a predetermined volume of an oxidizing solution that includes 1% NaClO in 2% KCl at a volumetric rate of between 0.5 ml/min and 2 ml/min through the carbonate core sample. In some examples, the predetermined volume of the pumped oxidizing solution is at least 5 times greater than a volume of the carbonate core sample. In some examples, the volumetric rate is between 0.75 ml/min and 1.5 ml/min. In some examples, the volumetric rate is between 0.9 ml/min and 1.1 ml/min. In some examples, the volumetric rate is 1 ml/min.

In some examples, the core sample is soaked in the 1% NaClO in 2% KCl oxidizing solution in sealed container. For example, computer 228 controls the outlet valve 254 to close to allow the core sample to fill (for example, saturate) with fluid. The computer 228 controls the inlet valves 240A, 240B to close after saturation to trap the fluid within the core sample to soak the core sample in the fluid.

At step 314, the carbonate core sample is heated to a first temperature of at least 60° C. after pumping the oxidizing solution through the carbonate core sample. In some examples, the carbonate core sample is heated to a first temperature between 60° C. and 100° C. In some examples, the first temperature between 60° C. and 100° C. is maintained for a duration between 1 hour and 4 hours. In some examples, the first temperature is between 80° C. and 100° C. In some examples, the first temperature is 95° C. For example, the computer 228 controls the furnace 232 to heat the core sample to 95° C. and maintain this temperature for 2 hours.

In some examples, the fluid further includes a surfactant. In such cases, at least partially restoring the porosity and the brine permeability of the flooded carbonate core sample includes heating the carbonate core sample to a second temperature between 350° C. and 600° C. and maintaining the temperature between 350° C. and 600° C. for a duration between 25 minutes and 4 hours. In some examples, the second temperature is between 350° C. and 500° C. In some examples, the second temperature is between 350° C. and 450° C. In some examples, the second temperature is 400° C. In some examples, the duration is between 1 hour and 3 hours. In some examples, the duration is 2 hours. For example, the computer 228 controls the furnace 232 to heat the core sample to 400° C. and maintain the 400° C. for 2 hours. In some examples, the flooded carbonate core sample is heated to a second temperature between 60° C. and 600° C. even if no surfactant is present in the core sample.

In some examples, heating the carbonate core sample to the second temperature between 350° C. and 600° C. includes controlling the second temperature to heat the carbonate core sample at a rate of between 4° C./min and 6° C./min. For example, the computer 228 controls the furnace 232 to heat the core sample to 400° C. at a rate between 4° C./min and 6° C./min. In some examples, the rate is 5° C./min.

In some examples, heating the carbonate core sample to the second temperature between 350° C. and 600° C. includes controlling the second temperature to heat the carbonate core sample at a rate having a stepwise increase of temperature in 50° C. increments with a dwell time of 15 minutes per increment. For example, the computer 228 controls the furnace 232 to heat the core sample to temperatures between 350° C. and 600° C. in 50° C. temperature increments after a dwell time of 15 minutes.

In some examples, at least partially restoring the flooded carbonate core sample includes pumping a predetermined volume of a non-oxidizing solution through the carbonate core sample at a volumetric rate of between 4 ml/min and 6 ml/min after heating the carbonate core sample to the temperature between 60° C. and 100° C. and after maintaining the temperature between 60° C. and 100° C. for the duration between 1 hour and 4 hours. In some examples, the non-oxidizing solution includes 2% KCl. In some examples, the predetermined volume of the pumped non-oxidizing solution is at least 5 times greater than the volume of the carbonate core sample. In some examples, the volumetric rate is between 4.5 ml/min and 5.5 ml/min. In some examples, the volumetric rate is 5.0 ml/min. For example, the pump 231C pumps the non-oxidizing solution of 2% KCl from the third container 238C to and through the core sample.

In some examples, at least partially restoring the flooded carbonate core sample includes (1) measuring a second porosity and a second brine permeability of the extracted carbonate core sample, (2) determining (i) whether the measured second porosity is at least 85% of the measured first porosity and (ii) whether the measured second brine permeability is at least 85% of the measured first brine permeability, and (3) responsive to determining that at least one of the measured second porosity is not at least 85% of the measured first porosity and the measured second brine permeability is not at least 85% of the measured first brine permeability: pumping the oxidizing solution through the carbonate core sample and heating the carbonate core sample to the first temperature of at least 60° C. after pumping the oxidizing solution through the carbonate core sample.

For example, the computer 228 determines whether the measured second porosity is at least 85% of the measured first porosity and whether the measured second permeability is at least 85% of the measured first permeability. If only one or neither of these conditions are true (for example, if the measured second porosity is less than 85% of the measured first porosity or if the measured second brine permeability is less than 85% of the measured first brine permeability), then the computer 228 repeats the processes described with reference to the restoration and post-restoration measurements section (for example, section C) of the examples. In some examples, the computer 288 repeats steps 312 and 314. The porosity and permeability values of the core sample generally improve after each cleaning.

In some examples, the computer 228 continuously repeats steps 312 and 314 until the measured second porosity and the measured second brine permeability are both at least 85% of the measured first brine permeability. In some examples, the computer 228 automatically (for example, without user input or intervention) instructs the respective components of the core sample restoration system 230 (for example, the pumps 231A-231C, the valves 240A-240C, the furnace 232, and the hydraulic system 246) to repeat the cleaning and restoration process (for example, steps 312 and 314) until the measured porosity is at least 85% of the measured first porosity and the measured second brine permeability is at least 85% of the measured first brine permeability.

In some examples, at least partially restoring the porosity and the brine permeability of the flooded carbonate core sample includes pumping an oxidizing solution (for example, 1% NaClO in 2% KCl) through the flooded carbonate core sample, heating the flooded carbonate core sample to a temperature of between 90° C. and 110° C., and maintaining the temperature for between 6 hours and 10 hours. For example, a temperature of 100° C. is maintained for 8 hours. For example, step C7 of example 3 shows that the computer 228 controls the furnace 232 to heat the core sample to 100° C. and maintain this temperature for 8 hours.

In some examples, at least partially restoring the porosity and the brine permeability of the flooded carbonate core sample includes pumping an oxidizing solution (for example, 1% NaClO in 2% KCl) through the flooded carbonate core sample, heating the flooded carbonate core sample to a temperature of between 220° C. and 600° C., and maintaining the temperature for between 25 minutes and 4 hours. For example, a temperature of 400° C. is maintained for 2 hours. For example, steps C9 and C10 of example 3 show that the computer 228 controls the furnace 232 to heat the core sample to 400° C. and maintain this temperature for 2 hours.

In some examples, at least partially restoring the porosity and the brine permeability of the flooded carbonate core sample includes pumping an oxidizing solution (for example, 1% NaClO in 2% KCl) through the flooded carbonate core sample, heating the flooded carbonate core sample to a temperature of between 60° C. and 100° C., and maintaining the temperature for between 1 hour and 4 hours. For example, a temperature of 95° C. is maintained for 2 hours. For example, step C4 of example 3 shows that the computer 228 controls the furnace 232 to heat the core sample to 95° C. and maintain this temperature for 2 hours.

Figure 11:
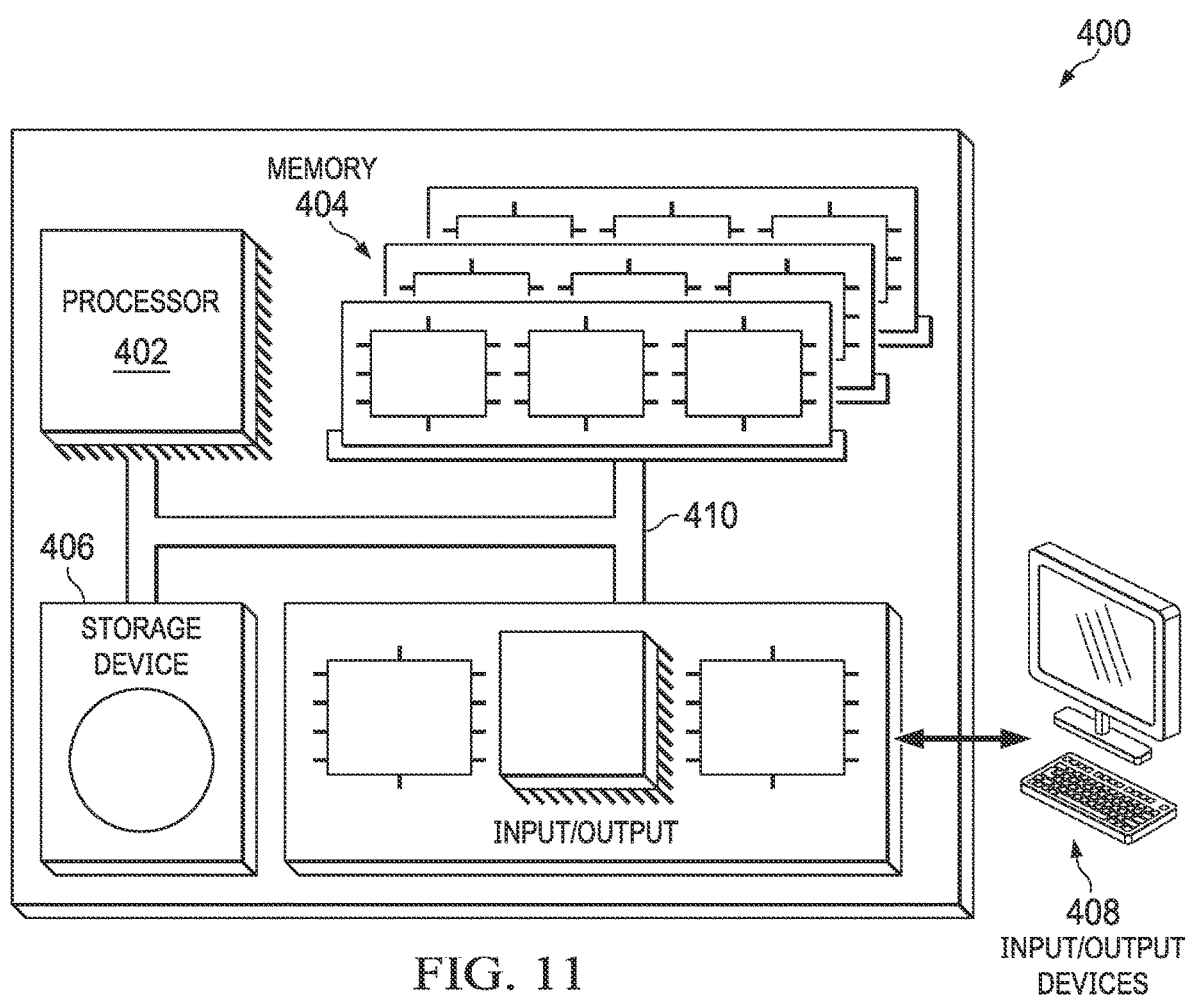
FIG. 11 is a schematic of a computer system for core sample restoration systems.

FIG. 11 is a schematic illustration of an example computer 400 for controlling core sample restoration system. For example, the computer 400 is operable to control the core sample restoration system 230 to restore porosity and permeability of a core sample.

The computer 400 is intended to include various forms of digital computers, such as printed circuit boards (PCB), processors, digital circuitry, or otherwise parts of a system for determining a subterranean formation breakdown pressure. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The computer 400 includes a processor 402, a memory 404, a storage device 406, and an input/output device 408 (for example, displays, input devices, sensors, valves, pumps). Each of the components 402, 404, 406, and 408 are interconnected using a system bus 410. The processor 402 is capable of processing instructions for execution within the computer 400. The processor may be designed using any of a number of architectures. For example, the processor 402 may be a CISC (Complex Instruction Set Computers) processor, a RISC (Reduced Instruction Set Computer) processor, or a MISC (Minimal Instruction Set Computer) processor.

In one implementation, the processor 402 is a single-threaded processor. In another implementation, the processor 402 is a multi-threaded processor. The processor 402 is capable of processing instructions stored in the memory 404 or on the storage device 406 to display graphical information for a user interface on the input/output device 408.

The memory 404 stores information within the computer 400. In one implementation, the memory 404 is a computer-readable medium. In one implementation, the memory 404 is a volatile memory unit. In another implementation, the memory 404 is a non-volatile memory unit.

The storage device 406 is capable of providing mass storage for the computer 400. In one implementation, the storage device 406 is a computer-readable medium. In various different implementations, the storage device 406 may be a floppy disk device, a hard disk device, an optical disk device, or a tape device.

The input/output device 408 provides input/output operations for the computer 400. In one implementation, the input/output device 408 includes a keyboard and/or pointing device. In another implementation, the input/output device 408 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method of at least partially restoring carbonate core samples, the method comprising:
   extracting a carbonate core sample from a subterranean formation;
   inserting the extracted carbonate core sample into a core flooding test machine;
   measuring a first porosity and a first brine permeability of the extracted carbonate core sample;
   pumping a fluid through the extracted carbonate core sample to flood the carbonate core sample, the fluid comprising at least one of a high-molecular weight polymer solution and a gel particle solution; and
   at least partially restoring the porosity and the brine permeability of the carbonate core sample by:
     pumping an oxidizing solution through the flooded carbonate core sample; and heating the carbonate core sample to a first temperature of at least 60° C. after pumping the oxidizing solution through the carbonate core sample.

2. The method of claim 1, wherein the oxidizing solution comprises at least one of NaClO, HClO, $K_2S_2O_8$, NaBrO, $KClO_3$, and $KMnO_4$.

3. The method of claim 2, wherein the oxidizing solution comprises 1% NaClO in 2% KCl.

4. The method of claim 3, wherein heating the carbonate core sample to the first temperature comprises heating the carbonate core sample to a temperature between 60° C. and 100° C.

5. The method of claim 4, wherein at least partially restoring the porosity and the brine permeability of the carbonate core sample further comprises maintaining the temperature between 60° C. and 100° C. for a duration between 1 hour and 4 hours.

6. The method of claim 5, wherein the fluid further comprises a surfactant and the at least partially restoring the porosity and the brine permeability of the carbonate core sample further comprises heating the carbonate core sample to a second temperature between 350° C. and 600° C.

7. The method of claim 6, wherein at least partially restoring the porosity and the brine permeability of the carbonate core sample further comprises maintaining the second temperature between 350° C. and 600° C. for a duration between 25 minutes and 4 hours.

8. The method of claim 6, wherein heating the carbonate core sample to the second temperature between 350° C. and 600° C. comprises controlling the second temperature to heat the carbonate core sample at a rate of between 4° C./min and 6° C./min.

9. The method of claim 6, wherein heating the carbonate core sample to the second temperature between 350° C. and 600° C. comprises controlling the second temperature to heat the carbonate core sample at a rate having a stepwise increase of temperature in 50° C. increments with a dwell time of 15 minutes per increment.

10. The method of claim 5, wherein pumping the oxidizing solution through the carbonate core sample comprises:
pumping a predetermined volume of an oxidizing solution comprising 1% NaClO in 2% KCl at a volumetric rate of between 0.5 ml/min and 2 ml/min through the carbonate core sample,
wherein the predetermined volume of the pumped oxidizing solution is at least 5 times greater than a volume of the carbonate core sample.

11. The method of claim 10, wherein at least partially restoring the porosity and the brine permeability of the flooded carbonate core sample further comprises:
pumping a predetermined volume of a non-oxidizing solution through the carbonate core sample at a volumetric rate of between 4 ml/min and 6 ml/min after heating the carbonate core sample to the temperature between 60° C. and 100° C. and after maintaining the temperature between 60° C. and 100° C. for the duration between 1 hour and 4 hours,
wherein the non-oxidizing solution comprises 2% KCl, and
wherein the predetermined volume of the pumped non-oxidizing solution is at least 5 times greater than the volume of the carbonate core sample.

12. The method of claim 1, wherein at least partially restoring the porosity and the brine permeability of the carbonate core sample further comprises:
measuring a second porosity and a second brine permeability of the extracted carbonate core sample;
determining (i) whether the measured second porosity is at least 85% of the measured first porosity and (ii) whether the measured second brine permeability is at least 85% of the measured first brine permeability; and
responsive to determining that at least one of the measured second porosity is not at least 85% of the measured first porosity and the measured second brine permeability is not at least 85% of the measured first brine permeability,
pumping the oxidizing solution through the carbonate core sample; and
heating the carbonate core sample to the first temperature of at least 60° C. after pumping the oxidizing solution through the carbonate core sample.

13. The method of claim 1, wherein the fluid comprises a high-molecular-weight acrylamide-based polymer solution, a super-molecular-weight polyacrylamide-based gel particle solution, or both.

14. A method of at least partially restoring carbonate core samples, the method comprising:
inserting a carbonate core sample extracted from a subterranean formation into a core flooding test machine;
measuring a first porosity and a first brine permeability of the carbonate core sample;
pumping a fluid through the carbonate core sample to flood the carbonate core sample, the fluid comprising at least one of a high-molecular weight polymer solution and a gel particle solution; and
at least partially restoring the porosity and the brine permeability of the carbonate core sample by:
pumping an oxidizing solution through the carbonate core sample, the oxidizing solution comprises 1% NaClO in 2% KCl;
heating the carbonate core sample to a temperature of between 60° C. and 600° C.; and
maintaining the temperature for at least 25 minutes.

15. The method of claim 14, wherein heating the carbonate core sample to a temperature between 60° C. and 600° C. comprises heating the carbonate core sample to a temperature between 90° C. and 100° C., and wherein maintaining the temperature for at least 25 minutes comprises maintaining the temperature for between 6 hours and 10 hours.

16. The method of claim 14, wherein the fluid further comprises a surfactant, wherein heating the carbonate core sample to a temperature between 60° C. and 600° C. comprises heating the carbonate core sample to a temperature between 220° C. and 600° C., and wherein maintaining the temperature for at least 25 minutes comprises maintaining the temperature for between 25 minutes and 4 hours.

17. The method of claim 14, wherein heating the carbonate core sample to a temperature of at least 60° C. comprises heating the carbonate core sample to a temperature between 60° C. and 100° C., and wherein maintaining the temperature for at least 25 minutes comprises maintaining the temperature for between 1 hour and 4 hours.

18. The method of claim 14, wherein pumping the oxidizing solution through the carbonate core sample comprises pumping a predetermined volume of the oxidizing solution through the carbonate core sample at a volumetric rate of between 0.5 ml/min and 2 ml/min, wherein the predetermined volume of the pumped oxidizing solution is at least 5 times greater than a volume of the carbonate core sample.

19. The method of claim 14, wherein at least partially restoring the porosity and the brine permeability of the carbonate core sample further comprises pumping a predetermined volume of a non-oxidizing solution through the carbonate core sample at a volumetric rate of between 4 ml/min and 6 ml/min, wherein the predetermined volume of the pumped non-oxidizing solution is at least 5 times greater than a volume of the carbonate core sample.

20. The method of claim 14, wherein at least partially restoring the porosity and the brine permeability of the carbonate core sample further comprises:

determining (i) whether the measured second porosity is at least 85% of the measured first porosity and (ii) whether the measured second brine permeability is at least 85% of the measured first brine permeability; and responsive to determining that at least one of the measured second porosity is not at least 85% of the measured first porosity and the measured second brine permeability is not at least 85% of the measured first brine permeability, pumping the oxidizing solution through the carbonate core sample;

heating the carbonate core sample to the temperature of between 60° C. and 600° C.; and maintaining the temperature for at least 25 minutes.

\* \* \* \* \*